United States Patent Office 3,123,525
Patented Mar. 3, 1964

3,123,525
CYCLIC TERPENE N-METHYL CARBAMATES AND PESTICIDAL COMPOSITIONS CONTAINING SAME
Robert J. Geary, Vero Beach, Fla., assignor to Plant Products Corporation, Vero Beach, Fla., a corporation of Florida
No Drawing. Filed Dec. 28, 1961, Ser. No. 162,982
10 Claims. (Cl. 167—30)

This invention relates to the production of novel chemical compounds, and more particularly to novel N-methyl carbamates having pesticidal properties and to pesticidal compositions containing the same.

A number of agricultural pesticides are known which are systemically active by reason of their ability to be absorbed into and translocated to all parts of the host plant in amounts lethal to insects and other pests feeding thereon for periods up to several months thereafter. Such pesticides must of course be substantially non-phytotoxic and relatively stable to deteriorating influences over extended periods, and should have certain solubility and other properties necessary for effective agricultural use. Most of these previously developed pesticides have however not been found entirely satisfactory because of some deficiency in one or more of the above-mentioned characteristics, unduly high costs, difficulty of production in sufficiently high yields, or for various other reasons.

It is an object of this invention to provide novel chemical compounds having improved pesticidal and other properties. Another object of this invention is the provision of such compounds which will not be subject to one or more of the aforementioned deficiencies and objectionable features. A further object of this invention is the provision of novel pesticidal compositions containing such compounds. Other objects and advantages will appear as the description proceeds.

The attainment of the above objects is made possible in accordance with this invention by the provision of N-methyl carbamate compounds having the formula RO—CONH—CH$_3$, wherein RO is the residue of a terpene alcohol. It has been found that these compounds are pesticides with surprisingly improved systemic activity and other desirable properties and characteristics required of pesticidal compounds without being subject to one or more of the aforementioned deficiencies and objectionable features.

The compounds of the present invention may be advantageously prepared by reacting methyl isocyanate with an equimolar amount of a terpene alcohol at an elevated temperature of at least about 50° C. The reaction is broadly represented by the equation $$ROH + OCN—CH_3 \rightarrow RO—CONH—CH_3$$

wherein ROH represents a terpene alcohol, which may also be referred to as a hydroxyl-containing terpene. As examples of terpene alcohols which may be employed as precursors of the compounds of the present invention, there may be mentioned cyclic terpene alcohols having the empirical formula $C_{10}H_{18-20}O_{1-2}$ such as alpha-terpineol, dihydro-alpha-terpineol, beta-terpineol, gamma-terpineol, terpinenol-1, terpin hydrate, borneol, isoborneol, fenchyl alcohol, and the like, and artificial and naturally occurring mixtures thereof such as whole-run, crude and refined pine oils.

The foregoing reaction may be conveniently carried out by introducing the required amounts of terpene alcohol and methyl isocyanate, the latter desirably in slight molar excess, into a high pressure vessel with great excess of air space so that the reaction mixture occupies no more than about 20% of total volume. The mixture is then heated gently, as on a steam bath, to complete the reaction which may in some instances require up to about 18 hours or more. Use of superatmospheric pressures and/or a catalyst such as boron fluoride or dimethylamine, for example in proportions of about 0.05 to 0.2 mole per mole of the terpene alcohol shortens the reaction time somewhat. The resulting reaction mixture is a crude terpene N-methyl carbamate which may be used for pesticidal purposes as is, or further purified by gently heating, desirably under vacuum, to distill off the excess methyl isocyanate and/or by adding a limited amount of petroleum ether or hexanol or the like and chilling to precipitate out the desired terpene N-methyl carbamate. These compounds are for the most part water insoluble sweet-smelling, brown to green, viscous liquids or amorphous solids at room temperature. They are soluble, in approximately decreasing order of solubility, in such organic solvents as acetone, xylene, alcohols such as methanol, ethanol and isopropanol, dimethylformamide, and dimethylsulfoxide.

In the above process, it will be understood that the reaction could if desired be carried out at lower temperatures down to room temperature, although this would be commercially impractical because of the unduly long reaction times required. Similarly, depending upon the particular terpene alcohol employed as reactant, it may in some instances be desirable to carry out the reaction in an inert organic diluent or solvent for one or both of the reactants.

As an alternative, the compounds of the present invention may be produced by reacting N-methyl carbamyl chloride (from phosgene and methylamine) with an equimolar amount of the terpene alcohol or alkali metal salt thereof, in the presence of an acid binding agent when using the free alcohol. This method is less preferred since the product contains salts which must be removed when the pure compound is required.

The compounds of the present invention are effective pesticides against animal and vegetable pests, including insects, mites and the like, and may be applied to the pest directly, or indirectly, as by application to the surface or other site frequented by the pest against which the present compounds act in a residual capacity, or by application to the soil, roots or other plant appendages whereby the compounds are absorbed into and translocated throughout the system of the plant frequented or attacked by the pest. The pesticidal compositions of the present invention are prepared by formulating the selected terpene N-methyl carbamate or mixture thereof with a carrier which may be a finely divided solid for use as a dust, or a liquid, for example as a suspension or dispersion in water, as an oil-in-water type emulsion or as a solution in an organic solvent. Desirably, the compositions should contain a surface-active agent which may be a dispersing agent or wetting agent, or a combination thereof.

In the formulation of powders for application as dusts, the terpene N-methyl carbamate is uniformly admixed with a free-flowing particulate dry inert solid carrier which may be organic or inorganic. Examples of such organic carriers include sawdust, the flours derived from soy bean, peach pit, apricot pit, tobacco, walnut shell, wheat, wood, by-product lignin and lignocellulose, lignin sulfonic acid, urea, cork, and the like. As inorganic carriers, there may be mentioned the silicas such as diatomite, pumicite, and tripolite, carbonates such as calcium bicarbonate, calcite and dolomite, silicates such as talc, pyrophillite, mica including vermiculite, and the like, various clays such as montmorillonite, saponite, kaolinite, attapulgite, and the like, tricalcium phosphate, boric acid, etc. These powders should preferably have a particle size of about 0.5 to 10 microns, which may be obtained with the usual mixing, blending or grinding equipment, and may generally contain, in addition to the carrier, about 5 to 75% of the active terpene N-methyl carbamate compound, and desirably about 0.5 to 3% of a wetting agent or dispersing agent or both. The addition of such agents renders the dust wettable, thereby facilitating the application thereof from an aqueous slurry in the field if desired. The ingredients may be simply mixed together thoroughly, or the active compound may be added and mixed in as a concentrated solution in a volatile organic solvent after which the solvent is evaporated off.

As examples of wetting agents which may be employed in the above described dust formulations, there may be mentioned broadly anionic, cationic and, preferably, nonionic surface-active agents. Exemplary of anionic surfactants are fatty alcohol sulfates such as sodium lauryl sulfate, salts of alkyl aryl sulfonates such as sodium dodecyl benzene sulfonate, N-higher acyl taurines such as palmitoyl methyl taurine, sulfonated fatty and polycarboxylic acids such as sulfonated castor oil and dioctyl ester of sodium sulfosuccinate, in addition to ordinary soaps such as sodium oleate and potassium stearate. Examples of nonionic surfactants include polyethylene glycol derivatives such as the condensation products of a plurality of moles (e.g. 2–20 or more) of ethylene oxide with higher aliphatic alcohols such as lauryl alcohol, alkyl phenols such as nonyl and dinonyl phenol, amines such as dodecyl amine, amides such as lauric acid amide, fatty acids such as stearic acid, and other higher molecular weight compounds of at least 6 carbon atoms containing a reactive hydrogen atom, as disclosed in U.S. Patent 1,970,578 and other patents. A specific nonionic agent preferred herein is isooctyl phenol decaethylene glycol ether. Exemplary of cationic surfactants are the higher molecular weight quaternary ammonium compounds such as stearyl dimethyl benzyl ammonium chloride, tetradecyl trimethyl ammonium sulfate, and the like.

Examples of suitable dispersing agents operative herein include calcium lignosulfonate, sodium naphthalene formaldehyde polymer sulfonate, or a water soluble salt of abietic acid (e.g. sodium abietate), or the like. The use of a wetting agent is primarily for the purpose of producing an improved protective film of the active carbamate compound over the plant surfaces and/or to improve penetration and contact therewith and with other surfaces to be treated with the present pesticidal compositions. They may also function as dispersing agents. The use of a dispersing agent is primarily for the purpose of obtaining an improved suspension of the solid particles of the composition in a liquid medium, preferably water.

As pointed out above, the carrier may also be a liquid if the active terpene N-methyl carbamate is to be applied in the form of a spray, or by brushing or impregnation. These liquid formulations may contain the terpene N-methyl carbamate in dilutions ranging from about 1:10 to 1:3,000 depending upon the liquid diluent, the intended use, and the like. The higher dilutions, as for example dilutions of 1:400 to 1:3,000 are employed in the case of application from aqueous slurries or aqueous oil-in-water emulsions. In producing the aqueous slurries or suspensions, the above described wettable powder formulations may be simply dispersed in the required amount of water in the field to produce the desired concentration necessary for spraying. In the production of oil-in-water emulsions, a concentrate of the carbamate compound in an organic solvent therefor may be prepared and made available for sale, or immediate use, which concentrate may preferably further contain an emulsifying agent of known type, as for example one of the above-described dispersing or wetting agents or the like. Such concentrates may then readily be emulsified in the required amount of water for application in the field.

If desired, the above described solutions of the present terpene N-methyl carbamate compounds in organic solvent solution may be applied as such, in more or less concentrated form, directly or indirectly to the pest, as for example in a small hand sprayer. In such cases, higher concentrations of the order of 1:10 to 1:100 dilution may be employed. If desired, such organic solvent formulation may be prepared in the form of an aerosol in which the active carbamate compound is dispersed in a liquid capable of expanding rapidly to atomize the composition. Such composition may contain up to 3% of the active carbamate, up to 10% of acetone or cyclohexane which acts as a coupling agent or mutual solvent, up to 10% of an oil such as mineral oil or vegetable oil, which serves to regulate the particle size, if desired, and the remainder a solvent capable of expanding rapidly at ordinary temperatures to form a gas, as for example a Freon such as dichloro-difluoromethane, or methyl chloride.

It will be understood that the carbamate compounds of the present invention may be applied in 100% form, but this is impractical because of difficulties in handling and application. Formulated pesticidal compositions as described above are therefore preferred. It will be also understood that these compositions may contain other functional agents and assistants such as other pesticides including insecticides, arachnicides, batericides, fungicides, and the like, bonding agents, spreading agents, sticking agents, extenders, and the like.

The following examples are only illustrative of this invention and are not to be regarded as limitative. All parts and proportions referred to herein and in the appended claims are by weight unless otherwise indicated.

Example 1

A mixture of 1 mole equivalent of alpha-terpineol and 1.05 mole equivalents of methyl isocyanate is introduced into a high pressure glass reaction vessel large enough so that the mixture occupies less than 20% of the enclosed volume. The vessel is closed, heated gently in a water bath for about 20 minutes and then on a steam bath for about 20 hours. The resulting N-methyl carbamate of alpha-terpineol, a water insoluble sweet-smelling, dark green amorphous solid at room temperature, is separated from the reaction mass by adding a small amount of hexanol and chilling to precipitate the carbamate.

Example 2

The procedure of Example 1 is repeated except for substitution of the alpha-terpineol by 1 mole equivalent of a pine oil composed of 65–70% of alpha-terpineol, 10% of dihydro-alpha-terpineol and other tertiary terpene alcohols, 10–15% of borneol and fenchyl alcohols, and 5% of estragole. The resulting product is a mixture of N-methyl carbamates of the respective terpene alcohols contained in the pine oil.

Example 3

The procedure of Example 1 is repeated except for substitution of the alpha-terpineol by 1 mole equivalent of a mixture of 55–60% of alpha-terpineol, 17–22% of beta-terpineol, and 23% of other tertiary terpene alcohols in the alpha-terpineol boiling range, and terpene hydrocarbons. The resulting product is a mixture of N-methyl carbamates of the respective terpene alcohols contained in the original mixture.

Example 4

A solution of 0.75 gram of the product of Example 1 in a minimum amount of acetone or dimethylformamide is thoroughly mixed into 14.25 grams of vermiculite (expanded mica) granules and the mixture dried. Soil in an open field is opened in rows 2 inches deep and the 15 grams of active mixture are uniformly spread into three rows of 3 feet each, randomized between untreated control rows. This distribution amounts to about 2 lbs. of active carbamate compound per acre, although amounts ranging from less than ½ to over 4 lbs. per acre may be employed effectively. The treated granules are covered with at least an inch of soil, seed (cotton, string bean, corn, peanut, etc.) planted directly thereover, and the seed in turn covered with soil. After germination of the seed, and two months later, plants growing in the treated rows show no evidence of phytosoxicity but, in contrast to plants growing in untreated rows, are found to be resistant to natural infestation by plant pests including many forms of lepidoptera such as Southern army worm and cotton leaf perforator, southern corn stalk borer, boll or corn ear worm, and thrips and the like. High mortality is noted in pests caged directly on various parts of the plants growing in the treated rows.

*Example 5*

A liquid concentrate composed of 25% of the product of Example 1 and 5% of isoctyl phenol decaethylene glycol ether dissolved in xylene, alcohol, acetone, dimethylformamide, or other organic solvent for the said product is emulsified in water. Plants growing in soil sprayed with this emulsion show no evidence of phytotoxicity and have resistant properties as described in Example 4. Plants dipped or sprayed directly with the emulsion are similarly protected.

*Example 6*

Twenty parts of the product of Example 1 are thoroughly mixed with 2 parts of isooctyl phenol decaethylene glycol ether and 78 parts of attaclay to produce a wettable powder suitable for application to the situs to be protected as a dust or in the form of an aqueous slurry.

When instead of the product of Example 1, the products of Examples 2 or 3 or any of the other terpene N-methyl carbamates described above are employed in the procedures of Examples 4, 5 and 6, similarly improved results are obtained.

This invention has been disclosed with respect to certain preferred embodiments, and various modifications and variations thereof obvious to persons skilled in the art are intended to be included within the spirit and purview of this application and the scope of the appended claims.

I claim:
1. An N-methyl carbamate compound having the formula RO—CONH—CH$_3$, wherein RO is the residue of a cyclic terpene alcohol having the empirical formula C$_{10}$H$_{18-20}$O$_{1-2}$.
2. A compound as defined in claim 1 wherein said terpene alcohol is alpha-terpineol.
3. A compound as defined in claim 1 wherein said terpene alcohol is dihydro-alpha-terpineol.
4. A compound as defined in claim 1 wherein said terpene alcohol is beta-terpineol.
5. A compound as defined in claim 1 wherein said terpene alcohol is gamma-terpineol.
6. A compound as defined in claim 1 wherein said terpene alcohol is borneol.
7. A pesticidal composition comprising a compound as defined in claim 1, a carrier therefor, and a surface active adjuvant selected from the group consisting of dispersing agents and wetting agents.
8. A pesticidal composition in dry particulate form comprising a compound as defined in claim 1, a finely divided carrier therefor, and a surface-active adjuvant selected from the group consisting of dispersing agents and wetting agents.
9. A pesticidal composition in liquid form comprising an oil-in-water emulsion in which the dispersed phase comprises a solution of a compound as defined in claim 1 in an organic solvent therefor.
10. A pesticidal composition in liquid form comprising a compound as defined in claim 1 dispersed in water with the aid of a dispersing agent.

References Cited in the file of this patent

UNITED STATES PATENTS 2,194,077   Roblin _____ Mar. 19, 1940